US012750785B2

(12) United States Patent
Gao

(10) Patent No.: US 12,750,785 B2
(45) Date of Patent: Sep. 29, 2026

(54) OPEN-LOOP POWER CONTROL METHOD AND APPARATUS FOR UPLINK PUSCH, AND STORAGE MEDIUM

(71) Applicant: Beijing Xiaomi Mobile Software Co., Ltd., Beijing (CN)

(72) Inventor: Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 338 days.

(21) Appl. No.: 18/294,947

(22) PCT Filed: Aug. 5, 2021

(86) PCT No.: PCT/CN2021/111028

§ 371 (c)(1),
(2) Date: Feb. 2, 2024

(87) PCT Pub. No.: WO2023/010465

PCT Pub. Date: Feb. 9, 2023

(65) Prior Publication Data

US 2024/0349198 A1 Oct. 17, 2024

(51) Int. Cl.
*H04W 52/10* (2009.01)
*H04W 52/14* (2009.01)

(52) U.S. Cl.
CPC ......... *H04W 52/10* (2013.01); *H04W 52/146* (2013.01)

(58) Field of Classification Search
CPC . H04W 52/146; H04W 52/10; H04W 72/232; H04W 52/325; H04W 52/40;
(Continued)

(56) References Cited

U.S. PATENT DOCUMENTS

2018/0013539 A1* 1/2018 Feng .................. H04W 52/243
2021/0051606 A1* 2/2021 Yang .................... H04W 80/02

FOREIGN PATENT DOCUMENTS

CN 110536394 A 12/2019

OTHER PUBLICATIONS

"Enhancements on Multi-TRP for PDCCH, PUCCH and PUSCH", Xiaomi, 3GPP TSG-RAN WG1 Meeting #104b-e, R1-2102960, e-Meeting, Apr. 12-20, 2021, 22 pages.

(Continued)

*Primary Examiner* — Ajibola A Akinyemi
(74) *Attorney, Agent, or Firm* — Finnegan, Henderson, Farabow, Garrett & Dunner, L.L.P.

(57) ABSTRACT

An open-loop power control (OLPC) method for an uplink physical uplink shared channel (PUSCH) is performed by a network device. The method includes: sending first indication information, wherein the first indication information indicates an open-loop power boosting value used when the PUSCH is sent based on multi-transmission reception point (multi-TRP) cooperation, and the open-loop power boosting value used when the PUSCH is sent corresponds to different cooperative TRPs to which the PUSCH is sent; and in response to an absence of a sounding reference signal (SRS) resource indication (SRI) indication field in the first indication information, configuring and determining an OLPC parameter of one or more transmission reception points (TRPs) used by a terminal when the terminal sends the PUSCH to multiple TRPs in a cooperation manner, the OLPC parameter comprising a corresponding open-loop power boosting value.

20 Claims, 6 Drawing Sheets

(58) Field of Classification Search
CPC ......... H04W 72/1268; H04W 72/0473; H04W 52/281; H04W 72/23; H04W 52/242; H04W 52/38; H04W 52/14; H04W 52/08; H04W 52/54; H04W 76/20; H04W 52/365; H04W 72/21
USPC .......................................................... 455/522
See application file for complete search history.

(56) References Cited

OTHER PUBLICATIONS

"Multi-TRP enhancements for PUCCH and PUSCH", Intel Corporation, BGPP TSG RAN WG1 Meeting #105-e, R1-2104889, e-Meeting, May 10-27, 2021, 7 pages.
Notice of Reasons for Refusal issued by the Japanese Patent Office on Nov. 27, 2024, in corresponding Application No. JP 2024-506964, 13 pages.
"Enhancements on Multi-TRP for PDCCH, PUCCH and PUSCH", Qualcomm Incorporated, 3GPP TSG-RAN WG1 Meeting #105-bis-e, R1-2104655, e-Meeting, May 10-May 27, 2021, 17 pages.
Office Action issued by the Patent Office of the Russian Federation Federal Institute of Industrial Property on Aug. 20, 2024, in corresponding Application No. RU 2024104856/07, 8 pages.
Extended European Search Report Issued in Application No. 21952351.1 dated Aug. 16, 2024, 8 pages.
International Search Report and Written Opinion of International Application No. PCT/CN2021/111028, dated Apr. 25, 2022, 13 pages.
"Enhancements on Multi-TRP for PDCCH, PUCCH and PUSCH", Qualcomm Incorporated, 3GPP TSG-RAN WG1 Meeting #104-e, R1-2101447, e-Meeting, Jan. 25-Feb. 5, 2021, 28 pages.
The First Office Action issued by the State Intellectual Property Office of People's Republic of China on Jul. 17, 2025, in corresponding Application No. CN 202180002407.6, 19 pages.

* cited by examiner

OPEN-LOOP POWER CONTROL METHOD AND APPARATUS FOR UPLINK PUSCH, AND STORAGE MEDIUM

CROSS REFERENCE TO RELATED APPLICATIONS

This application is a U.S. national phase of International Application No. PCT/CN2021/111028, filed on Aug. 5, 2021, the entire contents of which are incorporated herein by reference.

TECHNICAL FIELD

The disclosure relates to a field of communication technologies, more particularly, to an open-loop power control method and apparatus for an uplink physical uplink shared channel (PUSCH), and a storage medium.

BACKGROUND

With the development of communication technologies, beam-based transmission and reception may be used to ensure a coverage range. When a network device (such as a base station) has multiple Transmission Reception Points (TRPs), multiple TRPs (multi-TRP)/multiple PANELs can be used to provide a service to a terminal. The application of multiple TRPs/PANELS in the network device is mainly aimed at improving coverage at the edge of a cell, providing more balanced service quality within a service area, and data transmission is performed based on multi-TRPs/PANEL cooperation in different ways. From a perspective of a network form, deploying a network with a large number of distributed access points and centralized baseband processing may be more conducive to providing a balanced user experience rate, and significantly reduce latency and signaling overhead caused by cross-cell handover. By utilizing multi-TRPs/PANEL cooperation and utilizing multiple beams from multiple angles for channel transmission/reception, various occlusion/blocking effects can be better overcome, ensuring the robustness of link connections. It is suitable for an ultra reliable low latency communication (URLLC) service to improve transmission quality and to meet reliability requirements.

SUMMARY

According to a first aspect of embodiments of the disclosure, an open-loop power control method for an uplink PUSCH is provided. The method is performed by a network device, and includes:

sending first indication information, in which the first indication information indicates an open-loop power boosting value used when the PUSCH is sent based on multi-TRP cooperation, and the open-loop power boosting value used when the PUSCH is sent corresponds to different cooperative TRPs to which the PUSCH is sent; and in response to an absence of a sounding reference signal (SRS) resource indication (SRI) indication field in the first indication information, configuring and determining an OLPC parameter of one or more transmission reception points (TRPs) used by a terminal when the terminal sends a PUSCH to multiple TRPs in a cooperation manner, the OLPC parameter including a corresponding open-loop power boosting value.

According to a second aspect of embodiments of the disclosure, an open-loop power control method for an uplink PUSCH is provided. The method is performed by a terminal, and includes:

receiving first indication information, in which no sounding reference signal (SRS) resource indication (SRI) indication field exists in the first indication information, and the first indication information indicates an open-loop power boosting value used when a PUSCH is sent based on multi-TRP cooperation; and determining an open-loop power boosting value of one or more transmission reception points (TRPs) used by the terminal when the terminal sends the PUSCH to multiple TRPs in a cooperation manner, in which the open-loop power boosting value used when the PUSCH is sent corresponds to different cooperative TRPs that send the PUSCH.

According to a third aspect of embodiments of the disclosure, an open-loop power control device for an uplink PUSCH is provided. The device includes:

a processor; and a memory for storing instructions executable by the processor: in which the processor is configured to: perform the open-loop power control method for an uplink PUSCH of the first aspect or any implementation of the first aspect.

According to a fourth aspect of embodiments of the disclosure, an open-loop power control device for an uplink PUSCH is provided. The device includes:

a processor; and a memory for storing instructions executable by the processor: in which the processor is configured to: perform the open-loop power control method for an uplink PUSCH of the second aspect or any implementation of the second aspect.

It should be understood that the above general description and the following detailed descriptions are exemplary and explanatory only and do not limit the disclosure.

BRIEF DESCRIPTION OF THE DRAWINGS

The accompanying drawings, which are incorporated in and constitute a part of this specification, illustrate embodiments consistent with the embodiments of the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure.

Figure 1:
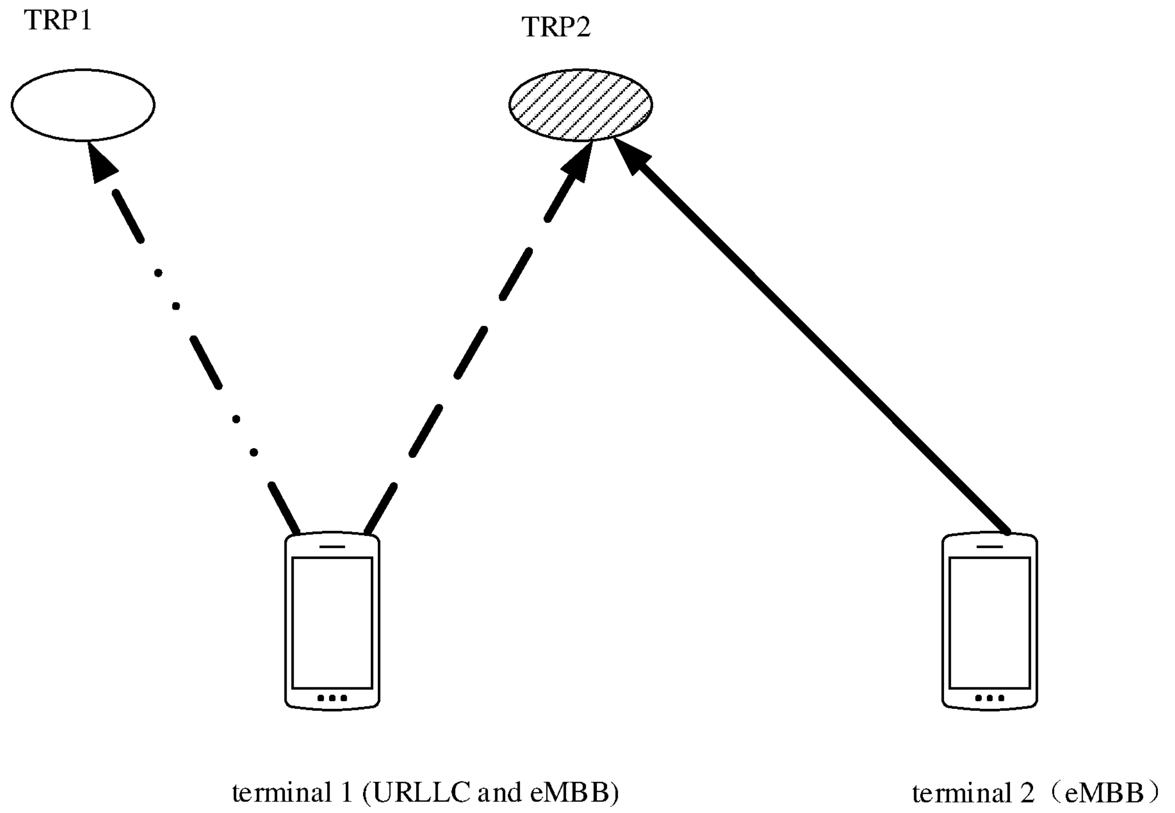
FIG. 1 is a schematic diagram of a communication system according to an exemplary embodiment.

An open-loop power control (OLPC) method for an uplink physical uplink shared channel (PUSCH) provided by the embodiments of the disclosure may be applied in a wireless communication system shown in FIG. 1. As illustrated in FIG. 1, the wireless communication system includes: a network device and a terminal. The terminal is connected to the network device through wireless resources and performs data transmission. Data transmission between the network device and the terminal is performed based on beams. The network device and the terminal can enhance PUSCH uplink transmission based on multiple transmission reception points (multi-TRP).

It can be understood that a number of transmission reception points (TRPs) used for multi-TRP-based data transmission between the network device and the terminal may be one or more. Performing data transmission between the network device and the terminals 1 and 2 based on TRP1 and TRP2 in the wireless communication system shown in FIG. 1 is only for schematic illustration, and it is not limited to this. It can be understood that more TRPs and terminals are also possible.

It is further understood that the wireless communication system shown in FIG. 1 is only for schematic illustration, and the wireless communication system may also include other network devices, such as a core network device, a wireless relay device and a wireless backhaul device, which are not shown in FIG. 1. The number of network devices and the number of terminals included in the wireless communication system are not limited in the embodiments of the disclosure.

It is further understood that the wireless communication system of the embodiments of the disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance (CSMS/CA). Depending on factors such as capacity, rate, and delay of different networks, the networks can be classified as a second Generation (2G) network, a 3G network, a 4G network, or a future evolved network, such as a 5G network. The 5G network can also be called as a new radio (NR) network. For easy of description, in this disclosure, sometimes the wireless communication network may referred to as a network for short.

The network device involved in the disclosure may also be referred to as a radio access network device. The radio access network device may be: a base station, an evolved base station (evolved node B, i.e., eNB), a femtocell, an access point (AP) in a wireless fidelity (WI-FI) system, a radio relay node, a radio backhaul node, a transmission point (TP) or a transmission and reception point (TRP), a gNB in an NR system, or components or a part of the devices that constitute the base station. It should be understood that the specific technology and the specific device form used by the network device are not limited in the embodiments of the disclosure. In this disclosure, the network device may provide a communication coverage for a specific geographic area, and may communicate with terminals located within the coverage area (cell). In addition, the network device may also be a vehicle-mounted device in a vehicle to everything (V2X) communication system.

The terminal involved in the disclosure may also be referred to as a terminal device, user equipment (UE), a mobile station (MS), or a mobile terminal (MT), which is a device that provides voice and/or data connectivity to a user. For example, the terminal can be a handheld device or a vehicle-mounted device with a wireless connectivity function. Currently, examples of the terminal are a mobile phone, a Customer Premise Equipment (CPE), a pocket personal computer (PPC), a handheld computer, a personal digital assistant (PDA), a laptop, a tablet computer, a wearable device, or a vehicle-mounted device, etc. In addition, the terminal device may also be a vehicle-mounted device in the V2X communication system. It should be understood that the specific technology and the specific device form used by the terminal are not limited in the embodiments of this disclosure.

In the research phase of R16, transmission enhancement is performed on a physical downlink shared channel (PDSCH) based on the application of a multi-point cooperation transmission technology between downlink multiple TRPs/PANELs. Data transmission includes scheduling feedback of uplink and downlink channels. Therefore, in research of the URLLC, only enhancing the downlink data channel cannot guarantee a service performance. Therefore, in the research of R17, enhancement is further performed a physical downlink control channel (PDCCH), a physical uplink control channel (PUCCH), and a physical uplink shared channel (PUSCH).

In a communication system, there are data services with different priorities, latency requirements, or reliability requirements, such as a URLLC service that has extremely high requirements for both latency and reliability, and an Enhanced Mobile Broadband (eMBB) service that has relatively low requirements for latency and reliability. In general, the URLLC service may adopt a shorter transmission time interval for scheduling, and the URLLC service has suddenness and randomness, exhibiting a scatter characteristic in resource distribution, with a low resource utilization. Therefore, reuse with eMBB transmission is considered to improve the resource utilization. Unlike downlink transmission, a terminal cannot determine whether a transmission resource of service data when sending uplink data overlap with that of a service with a different priority transmitted by other terminals.

In this disclosure, open-loop power control can be performed between the network device and the terminal. In R16, an open-loop power control parameter set indication is introduced in scheduling downlink control information (DCI) to indicate a power boosting indication function for scheduling the PUSCH, and a new Radio Resource Control (RRC) parameter P0-PUSCH-Set is introduced to indicate power control. Each sounding reference signal (SRS) resource indication (SRI) corresponds to a P0-PUSCH-Set parameter of the open-loop power control, and the SRI is indicated by an open-loop power control parameter set indication field.

The network device notifies the terminal whether there is a power control parameter set indication field through a high-level signaling p0-PUSCH-SetList-r16. When the high-level parameter p0-PUSCH-SetList-r16 is not configured, the open-loop power control parameter set indication field is 0 bit, meaning that the open-loop power control parameter set indication field does not exist, and the terminal obtains P0 from P0-PUSCH-AlphaSet based on a mechanism of the original Rel-15. When the high-level parameter p0-PUSCH-SetList-r16 is configured, the open-loop power control parameter set indication field may be configured as 1 bit or 2 bits through a high-level signaling, where:

1) When an SRI indication field exists in the DCI, the open-loop power control parameter set indication field is configured as 1 bit.

2) When no SRI indication field exists in the DCI, the open-loop power control parameter set indication field can be configured as 1 bit or 2 bits according to a high-level signaling.

3) For the above scenario where an SRI indication field exists in the DCI, if information of the open-loop power control parameter set indication field is "0", the Rel-15 mechanism may still be used to obtain P0 from P0-PUSCH-AlphaSet according to the SRI indication. If information of the open-loop power control parameter set indication field is "1", the terminal obtains P0 from the open-loop parameter set P0-PUSCH-Set used for power boosting according to the SRI indication.

For a scenario where no SRI field exists in the DCI, RAN1 #99 meeting approved that an indication field of open-loop power control in the DCI can be configured as 1 bit or 2 bits, and the P0-PUSCH-Set parameter can be configured with up to two P0 values.

In embodiments of the disclosure, a scenario in which the open-loop power control method for an uplink PUSCH is used is a scenario where a power control parameter is adjusted due to service conflicts that occur during the communication of the terminal. For example, in FIG. 1, terminal 1 performs the URLLC service and the eMBB service, and terminal 2 performs the eMBB service. A starting point of embodiments of the disclosure is to apply to a situation where the terminal 1 requires three different open-loop power levels for power boosting of the eMBB service and URLLC service when the terminal 1 which is configured with both the eMBB service and the URLLC service conflicts with the terminal 2 which is configured with the eMBB service. The three different open-loop power levels are: 1) baseline P0 used for the power boosting of eMBB service, obtained from the P0-PUSCH AlphaSet: 2) higher P0 used for power boosting of a URLLC service that does not conflict with an eMBB service: 3) highest P0 used for a URLLC PUSCH that conflicts with an eMBB.

To provide a clearer description of how the terminal determines P0 based on high-level parameters and DCI indications, please refer to Table 1. Table 1 shows how the terminal determines P0 based on high-level parameters and DCI indications.

TABLE 1

| high-level parameter | SRI indication field | open-loop power control parameter set indication field | UE obtaining P0 |
|---|---|---|---|
| P0-PUSCH-Set-List being not configured | — | 0 bit | obtaining P0 from an Rel-15 parameter P0-PUSCH-AlphaSet |
| P0-PUSCH-Set-List being configured | existing | configuring 1 bit only, indicated as "0" | obtaining P0 from an Rel-15 parameter P0-PUSCH-AlphaSet |
| | | configuring 1 bit only, indicated as "1" | obtaining P0 from P0-PUSCH-Set |
| | not existing | configuring 1 bit, indicated as "0"; or configuring 2 bits, indicated as "00" | obtaining P0 from an Rel-15 parameter P0-PUSCH-AlphaSet |
| | | configuring 1 bit, indicated as "1"; or configuring 2 bits, indicated as "01" | obtaining P0 from P0-PUSCH-Set |
| | | configuring 2 bits, indicated as "10" | determining a second value of P0-PUSCH-Set as P0 |

In related art, data transmission between the network device and the terminal is based on beams. In R17, enhancement of PUSCH uplink transmission between the network device and the terminal can be performed based on multi-TRP. In the solution of PUSCH enhancement based on multi-TRP, a situation of in which a URLLC service based on multi-TRP transmission conflicts with an eMBB service in different TRPs may occur in a transmission scenario of PUSCH. That is, collision interference received by two TRPs of the network device are different. According to a current adjustment method, a scheduling PUSCH in conflict corresponds to one power boosting adjustment parameter of an open-loop power, and the terminal is not sure resources on which TRP are in conflict. Therefore, the open-loop power is adjusted in two different TRP transmission directions at the same time based on the same power boosting parameter of the open-loop power. This may result in a problem of wasting valuable transmission power of the terminal, directly increasing interference to other users, and reducing system performance. Therefore, the power boosting mechanism of the OLPC needs to be enhanced.

How to further solve the problem of power boosting control for multiple TRPs in the absence of the SRI indication field, so as to optimize a control method for the URLLC service considering situations where eMBB service interferences received by different TRPs are the same and different in the absence of the SRI indication field.

Embodiments of the disclosure provide an open-loop power control method for an uplink PUSCH, in which a network device sends indication information for indicating an open-loop power boosting value used when the PUSCH is sent based on multi-TRP cooperation, such as a DCI for scheduling or activating of an OLPC parameter used for sending the PUSCH, hereinafter referred to as the first indication information. In an absence of an SRI indication field in the first indication information, an OLPC parameter of one or more TRPs used by a terminal when the terminal sends the PUSCH to multiple TRPs in a cooperation manner is configured and determined. The OLPC parameter includes a corresponding open-loop power boosting value, and the open-loop power boosting value used when the PUSCH is sent corresponds to different cooperative TRPs to which the PUSCH is sent. This achieves the open-loop power control in PUSCH enhancement based on multi-TRP, i.e., enhancement of OLPC is performed.

Figure 2:
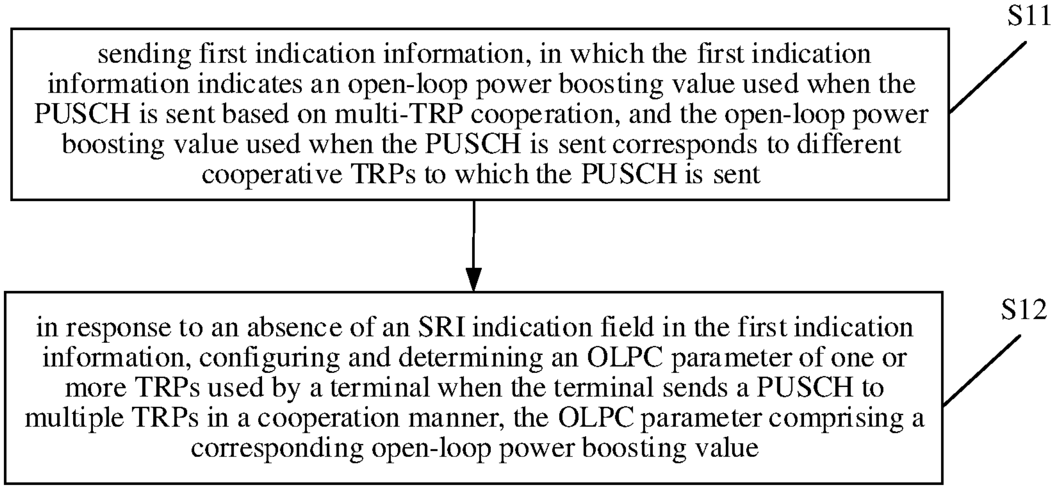
FIG. 2 is a flowchart of an open-loop power control method for an uplink physical uplink shared channel (PUSCH) according to an exemplary embodiment.

FIG. 2 is a flowchart of an open-loop power control method for an uplink PUSCH according to an exemplary embodiment. The method may be performed alone or in combination with other embodiments of the disclosure. As illustrated in FIG. 2, the method includes the following steps.

At step S11, first indication information is sent.

The first indication information is used to indicate an open-loop power boosting value used when the PUSCH is sent based on multi-TRP cooperation. The open-loop power boosting value used when the PUSCH is sent corresponds to different cooperative TRPs to which the PUSCH is sent.

At step S12, in response to an absence of SRI indication field in the first indication information, an OLPC parameter of one or more TRPs used by the terminal when the terminal sends the PUSCH to multiple TRPs in a cooperation manner is configured and determined, the OLPC parameter includes a corresponding open-loop power boosting value.

In embodiments of the disclosure, the OLPC parameter of one or more TRPs used by the terminal when the terminal sends the PUSCH to multiple TRPs in a cooperation manner is configured and determined, realizing that a power boosting parameter used when the PUSCH is sent corresponds to different cooperative TRPs to which the PUSCH is sent. Thus, the OLPC parameter for using the multiple TRPs are extended and enhanced for power boosting, enhancing the power boosting mechanism of OLPC.

In an implementation of embodiments of the disclosure, by enhancing the power control parameter of the OLPC, a power control parameter set may be configured for each TRP direction of the multiple cooperative TRPs, so that each power control parameter set includes OLPC parameter of the corresponding TRP direction, thereby determining the open-loop power boosting value of the one or more TRPs used when the PUSCH is sent based on multi-TRP cooperation.

Figure 3:
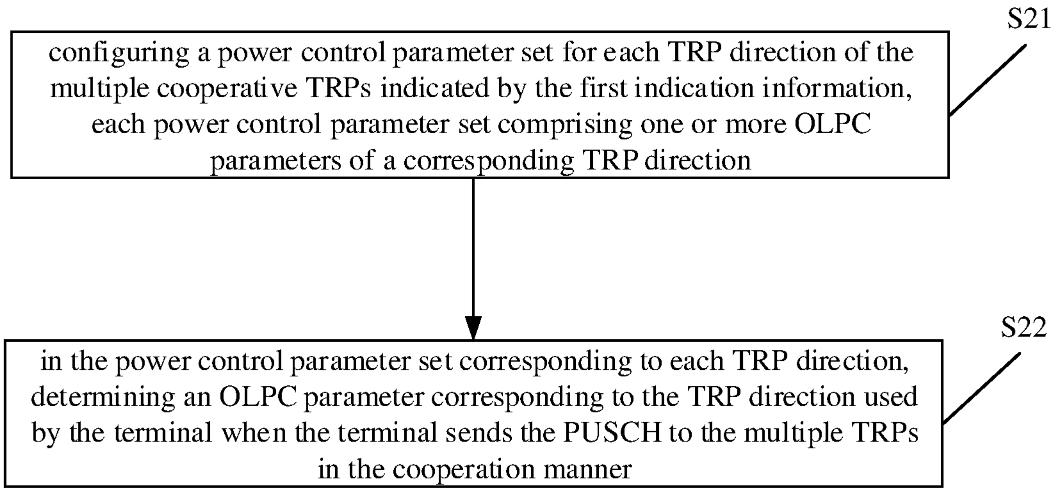
FIG. 3 is a flowchart of an open-loop power control method for an uplink PUSCH according to an exemplary embodiment.

FIG. 3 is a flowchart of an open-loop power control method for an uplink PUSCH according to an exemplary embodiment. The method may be performed alone or in combination with other embodiments of the disclosure. As illustrated in FIG. 3, the method includes the following steps.

At step S21, a power control parameter set is configured for each TRP direction of the multiple cooperative TRPs indicated by the first indication information, each power control parameter set including one or more OLPC parameters of a corresponding TRP direction.

At step S22, in the power control parameter set corresponding to each TRP direction, an OLPC parameter corresponding to the TRP direction used by the terminal when the terminal sends the PUSCH to the multiple TRPs in the cooperation manner is determined.

In another implementation of embodiments of the disclosure, an information field indicating the open-loop power boosting value of the one or more TRPs used by the terminal when the terminal sends the PUSCH to the multiple TRPs in the cooperation manner can be enhanced, to determining the open-loop power boosting value of the one or more TRPs used when the PUSCH is sent based on multi-TRP cooperation.

In an implementation, the first indication information is carried in a DCI, and the DCI includes an information field for indicating to perform the open-loop power control. The information field is used to indicate the open-loop power boosting value of the one or more TRPs used by the terminal when the terminal sends the PUSCH to the multiple TRPs in the cooperation manner.

In embodiments of the disclosure, the DCI information field for indicating the open-loop power control in the related art can be enhanced, the information field is used to indicate that the one or more TRPs used when the terminal sends the PUSCH to the multiple TRPs in the cooperation manner correspond to a same OLPC parameter. In other words, the multiple TRP directions for sending the PUSCH in a cooperation manner correspond to a same power boosting value.

In embodiments of the disclosure, the DCI information field for indicating the open-loop power control in the related art can be configured with OLPC power code points with different bits through a high-level signaling, as shown in Table 1. In the absence of the SRI indication field in the DCI, 0 bit, 1 bit, or 2 bits can be configured. For the convenience of description, the OLPC code point configured for the DCI information field for indicating the open-loop power control in the related art is referred to as a first OLPC power code point. That is, the DCI includes the first OLPC power code point associated with the PUSCH power control set corresponding to each TRP.

When determining the OLPC power control parameter of the one or more TRPs used by the terminal when the terminal sends the PUSCH to the multiple TRPs in the cooperation manner, an open-loop power boosting value used on a corresponding TRP when the terminal sends the PUSCH to the multiple TRPs in the cooperation manner can be determined in the PUSCH power control set corresponding to each TRP associated with the first OLPC power code point.

Figure 4:
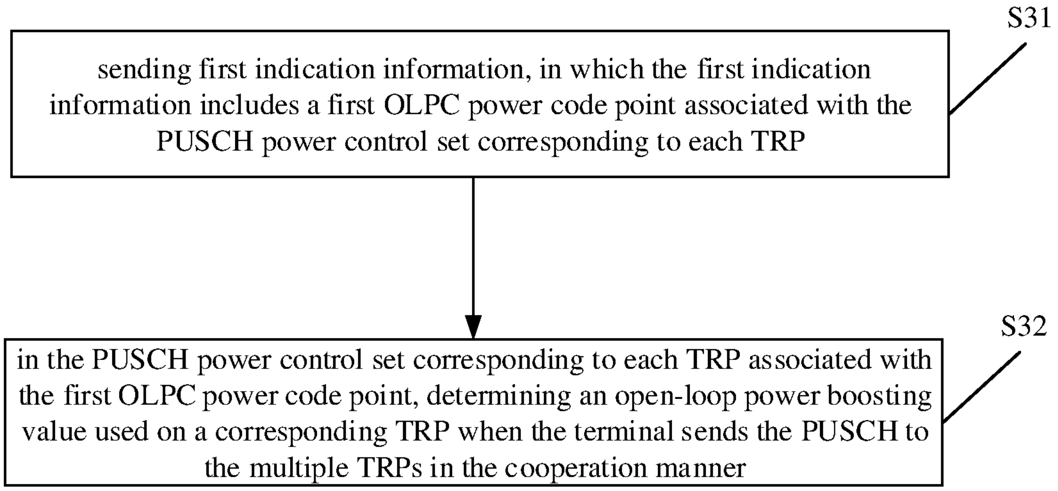
FIG. 4 is a flowchart of an open-loop power control method for an uplink PUSCH according to an exemplary embodiment.

FIG. 4 is a flowchart of an open-loop power control method for an uplink PUSCH according to an exemplary embodiment. The method may be performed alone or in combination with other embodiments of the disclosure. As illustrated in FIG. 4, the method includes the following steps.

At step S31, first indication information is sent, the first indication information includes a first OLPC power code point associated with the PUSCH power control set corresponding to each TRP.

At step S32, in the PUSCH power control set corresponding to each TRP associated with the first OLPC power code point, an open-loop power boosting value used on a corresponding TRP when the terminal sends the PUSCH to the multiple TRPs in the cooperation manner is determined.

Referring to Table 1, when the first OLPC power code point indicated by the information field in the DCI is configured as 1 bit, and this 1 bit indicates "0", it can support determining the open-loop power boosting value used on the corresponding TRP when the terminal sends the PUSCH to the multiple TRPs in the cooperation manner in P0-PUSCH AlphaSet. When the first OLPC power code point indicated by the information field in the DCI is configured as 1 bit, and this 1 bit indicates "1", it can support determining the open-loop power boosting value used on the corresponding TRP when the terminal sends the PUSCH to the multiple TRPs in the cooperation manner in P0-PUSCH-Set. That is, when the DCI information field for indicating the open-loop power control is configured to 1 bit, it can support selecting the open-loop power boosting value used on different TRPs from the P0-PUSCH AlphaSet and the P0-PUSCH Set.

Referring to Table 1, when the first OLPC power code point indicated by the information field in the DCI is configured as 2 bits, and the 2 bits indicate "00", it can support determining the open-loop power boosting value used on the corresponding TRP when the terminal sends the PUSCH to the multiple TRPs in the cooperation manner in P0-PUSCH AlphaSet. When the first OLPC power code point indicated by the information field in the DCI is configured as 2 bits, and this 2 bit indicates "01", it can support determining a first P0 in P0-PUSCH-Set as the open-loop power boosting value used on the corresponding TRP when the terminal sends the PUSCH to the multiple TRPs in the cooperation manner. When the first OLPC power code point indicated by the information field in the DCI is configured as 2 bits, and the 2 bits indicate "10", it can support determining the second P0 in the P0-PUSCH-Set as the open-loop power boosting value used on the corresponding TRP when the terminal sends the PUSCH to the multiple TRPs in the cooperation manner. That is to say, when the DCI information field for indicating the open-loop power control is configured to 2 bits, configuration selection can be supported in the first P0 value in P0-PUSCH AlphaSet/P0-PUSCH AlphaSet, or the second P0 value in P0-PushCH-Set/P0-PushCH-Set.

In embodiments of the disclosure, indication information for indicating whether the one or more TRPs used when the terminal sends the PUSCH to the multiple TRPs in the cooperation manner have a same interference situation can be added to the DCI. This indication information is hereinafter referred to as second indication information.

If the second indication information indicates that the one or more TRPs used when the terminal sends the PUSCH to the multiple TRPs in the cooperation manner have the same interference situation, the multiple TRPs have the same interference situation can use the same open-loop power control parameter. For example, the solution involved in the above embodiments can be used. That is, the open-loop power boosting value used on a corresponding TRP when the terminal sends the PUSCH to the multiple TRPs in the cooperation manner is determined in the PUSCH power control set corresponding to each TRP associated with the first OLPC power code point.

In embodiments of the disclosure, if the second indication information indicates that the one or more TRPs used when the terminal sends the PUSCH to the multiple TRPs in the cooperation manner have different interference situations, the second indication information can further indicate information of a TRP that requires power boosting in one or more TRPs used when the PUSCH is sent to the multiple TRPs in the cooperation manner. It is also possible to use a default mode to determine the open-loop power boosting value used on the corresponding TRP when the terminal sends the PUSCH to the multiple TRPs in the cooperation manner, without indicating the information of the TRP that requires power boosting in the one or more TRPs used when the PUSCH is sent to the multiple TRPs in the cooperation manner.

Based on the above embodiments, the DCI carrying the first indication information in the embodiment of the disclosure includes the first OLPC power code point and the second indication information. The second indication information is used to indicate whether the one or more TRPs used when the terminal sends the PUSCH to the multiple TRPs in the cooperation manner have a same interference situation, and/or the information of a TRP that requires power boosting in one or more TRPs used when the PUSCH is sent to the multiple TRPs in the cooperation manner.

Figure 5:
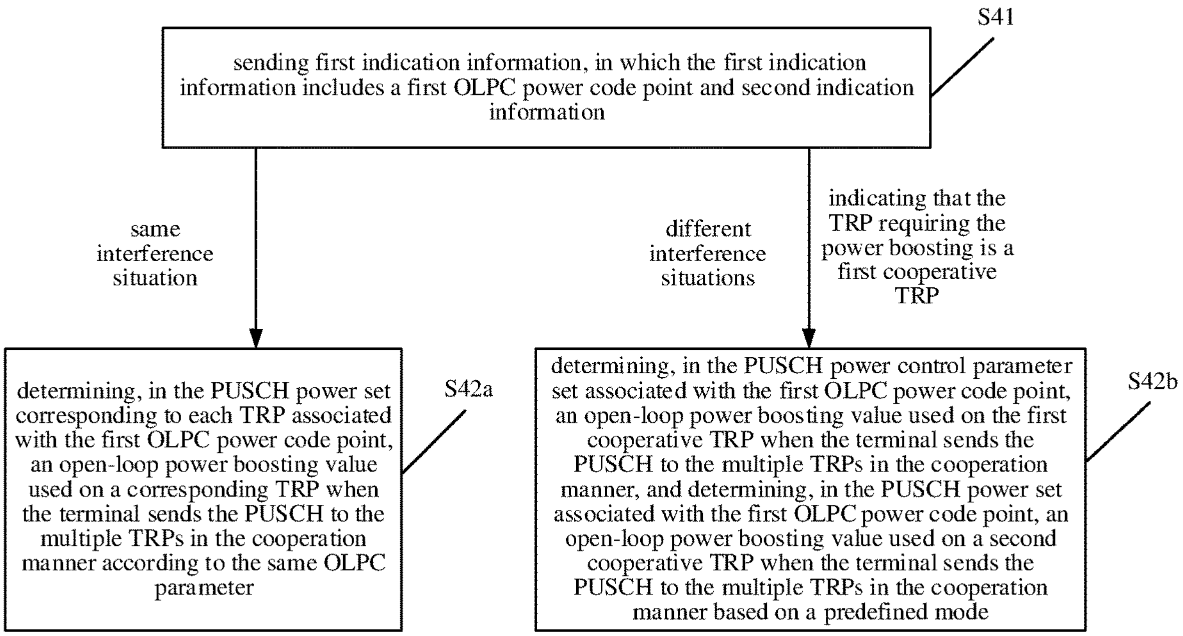
FIG. 5 is a flowchart of an open-loop power control method for an uplink PUSCH according to an exemplary embodiment.

FIG. 5 is a flowchart of an open-loop power control method for an uplink PUSCH according to an exemplary embodiment. The method may be performed alone or in combination with other embodiments of the disclosure. As illustrated in FIG. 5, the method includes the following steps.

At step S41, first indication information is sent, the first indication information includes a first OLPC power code point and second indication information.

In an implementation, in response to the second indication information indicating that the one or more TRPs used when the terminal sends the PUSCH to the multiple TRPs in the cooperation manner have the same interference situation, step S42*a* is performed.

At step S42*a*, in response to the second indication information indicating that the one or more TRPs used when the terminal sends the PUSCH to the multiple TRPs in the cooperation manner have the same interference situation, an open-loop power boosting value used on a corresponding TRP when the terminal sends the PUSCH to the multiple TRPs in the cooperation manner is determined according to the same OLPC parameter in the PUSCH power set corresponding to each TRP associated with the first OLPC power code point.

In an implementation, in response to the second indication information indicating that the one or more TRPs used when the terminal sends the PUSCH to the multiple TRPs in the cooperation manner have different interference situations, step S42*b* is performed.

At step S42*b*, in response to the second indication information indicating that the one or more TRPs used when the terminal sends the PUSCH to the multiple TRPs in the cooperation manner have different interference situations, or the second indication information indicating that the TRP requiring the power boosting is a first cooperative TRP, an open-loop power boosting value used on the first cooperative TRP when the terminal sends the PUSCH to the multiple TRPs in the cooperation manner is determined in in the PUSCH power control parameter set associated with the first OLPC power code point.

Based on a predefined mode, an open-loop power boosting value used on a second cooperative TRP when the terminal sends the PUSCH to the multiple TRPs in the cooperation manner is determined in the PUSCH power set associated with the first OLPC power code point.

The second cooperative TRP includes one or more other TRPs different from the first cooperative TRP in the one or more TRPs used when the terminal sends the PUSCH to the multiple TRPs in the cooperation manner.

The second indication information mentioned above in embodiment of the disclosure can be represented by an extended bit obtained by performing bit extension through the Open-loop power control parameter set indication field. For example, in the absence of the SRI indication field in the DCI, the Open-loop power control parameter set indication field can be configured with 0 bit, 1 bit, or 2 bits. After extending the open-loop power control parameter set indication field by 1 bit, the open-loop power control parameter set indication field can be configured with 0 bit, 2 bits, or 3 bits. The open-loop power control parameter set indication field configured with 1 bit, 2 bits, or 3 bits can be used to indicate an OLPC control parameter set associated with the PUSCH power control set corresponding to each TRP, as well as to indicate whether the one or more TRPs used when the terminal sends the PUSCH to the multiple TRPs in the cooperation manner have a same interference situation, and/or information of a TRP that requires power boosting in one or more TRPs used when the PUSCH is sent to the multiple TRPs in the cooperation manner.

In an implementation, the second indication information may be a maximum extended bit in the Open-loop power control parameter set indication field. Alternatively, the second indication information may be a minimum extended bit value in the Open-loop power control parameter set indication field.

In embodiments of the disclosure, when the Open-loop power control parameter set indication field is configured to 0 bit, interference information about whether the cooperative TRPs have the same interference situation is not required. That is, the second indication information may not be included. In an example, when the Open-loop power control parameter set indication field is configured to 0 bit, P0 from each P0 PUSCH AlphaSet set of each cooperative TRP can be selected for each cooperative TRP.

In embodiments of the disclosure, when the Open-loop power control parameter set indication field is configured as 2 bits or 3 bits, the interference information about whether the cooperative TRPs have the same interference situation can be included. That is, the second indication information can be included. For example, in the case of extending to the maximum extended bit, a value of the maximum extended bit is used to indicate the second indication information. Other bits in the Open-loop power control parameter set indication field can indicate the PUSCH power control set corresponding to each TRP using the indication method shown in Table 1.

In an example, when the Open-loop power control parameter set indication field is configured to 2 bits, P0 is selected from P0 PUSCH AlphaSet and P0 PUSCH Set, and the selected P0 is used for the TRP (first cooperative TRP) indicated by the DCI. In addition, for other cooperative TRPs (second cooperative TRPs), P0' may be selected through a predefined method. For example, if P0 of P0-PUSCH Set is applied to TRP1, P0 of P0-PUSCH AlphaSet is applied to TRP2.

In an example, when the Open-loop power control parameter set indication field is configured to 3 bits, the open-loop power of the cooperative TRP can be selected from the first P0 value of P0-PUSCH AlphaSet/P0-PUSCH-Set, or the second P0 value of P0-PUSCH AlphaSet/P0-PUSCH-Set, and P0 can be used for the TRP (the first cooperative TRP) indicated by the DCI. In addition, for other cooperative TRPs (second cooperative TRPs), P0' may be selected through a predefined method. For example, if P0 power boosting is applied to TRP1, then P0 of P0 PUSCH AlphaSet is applied to TRP2.

It can be understood that the first cooperative TRP mentioned above in embodiments of the disclosure includes one or more TRPs.

In embodiments of the disclosure, after determining the OLPC power boosting value, a cooperative TRP applicable to the OLPC power boosting value can be determined.

Method 1: the cooperative TRP applicable to the OLPC power boosting value is determined according to an SRS resource set identifier corresponding to a power control parameter set corresponding to each TRP direction, where a magnitude of the SRS resource set identifier has a correspondence with a direction order of the TRPs. For example, a TRP corresponding a minimum SRS resource set identifier is fixed as the first TRP. the cooperative TRP applicable to the OLPC power boosting value is determined according to the SRS resource set identifier corresponding to the power control parameter set corresponding to the TRP direction.

It can be understood that, determining the cooperative TRP applicable to the OLPC power boosting value according to the SRS resource set identifier corresponding to the power control parameter set corresponding to the TRP direction is independent of the DCI indication field used for dynamically indicating switching between a single-TRP mode and a multi-TRP mode.

Method 2: the cooperative TRP applicable to the OLPC power boosting value is determined according to a mapping relationship between the cooperative TRPs and the SRS resource sets indicated in the DCI indication field for dynamically indicating switching between a single-TRP mode and a multi-TRP mode.

For example, the direction order of the cooperative TRPs is consistent with the mapping relationship between the cooperative TRPs and the SRS resource sets indicated in the DCI indication field.

The DCI indication field for dynamically indicating switching between a single-TRP mode and a multi-TRP mode can be shown in Table 2 below.

TABLE 2

| Code point | SRS resource set(s) | SRI (for both CB and NCB)/TPMI (CB only) field(s) |
|---|---|---|
| 00 | s-TRP mode with 1$^{st}$ SRS resource set (TRP1) | 1$^{st}$ SRI/TPMI field (2$^{nd}$ field is unused) |
| 01 | s-TRP mode with 2$^{nd}$ SRS resource set (TRP2) | 1$^{st}$ SRI/TPMI field (2$^{nd}$ field is unused) |
| 10 | m-TRP mode with (TRP1, TRP2 order)<br>1$^{st}$ SRI/TPMI field: 1$^{st}$ SRS resource set<br>2$^{nd}$ SRI/TPMI field: 2$^{nd}$ SRS resource set | Both 1$^{st}$ and 2$^{nd}$ SRI/TPMI fields |
| 11 | m-TRP mode with (TRP2, TRP1 order)<br>1$^{st}$ SRI/TPMI field: 2$^{nd}$ SRS resource set<br>2$^{nd}$ SRI/TPMI field: 1$^{st}$ SRS resource set<br>Or<br>1$^{st}$ SRI/TPMI field: 1$^{st}$ SRS resource set<br>2$^{nd}$ SRI/TPMI field: 2$^{nd}$ SRS resource set | Both 1$^{st}$ and 2$^{nd}$ SRI/TPMI fields |

Referring to Table 2, an information field defined in DCI0_1/0_2 indicates that PUSCH transmission can be switched dynamically between the single-TRP mode and the multi-TRP mode. That is, it indicates whether the current scheduling PUSCH uses the single-TRP transmission or the multi-TRP transmission. If multi-TRP transmission is used, a TRP flip function is supported. That is, it supports transmission in the order of TRP1, TPR2 or in the order of TRP2, TRP1.

In embodiments of the disclosure, the first cooperative TRP corresponds to the first SRS resource set, and the second cooperative TRP corresponds to the second SRS resource set. Or, the first cooperative TRP corresponds to the second SRS resource set, and the second cooperative TRP corresponds to the first SRS resource set.

In an example, when the protocol-defined DCI indication field for dynamically indicating switching between the single-TRP mode and the multi-TRP mode indicates that the first TRP and the second TRP support flipping, it means that the second TRP corresponds to the first OLPC indication parameter, and the first TRP corresponds to the second OLPC indication parameter.

In embodiments of the disclosure, the first indication information indicating the open-loop power boosting value used when the PUSCH is sent based on multi-TRP cooperation, and in response to the absence of the SRI indication field in the first indication information, the OLPC parameter of the one or more TRPs used by the terminal when the terminal sends the PUSCH to multiple TRPs in the cooperation manner is determined and configured. The OLPC parameter includes the corresponding open-loop power boosting value. The open-loop power boosting value used when the PUSCH is sent corresponds to different cooperative TRPs that send the PUSCH, thus realizing the open-loop power control in PUSCH enhancement based on multi-TRP. For example, for PUSCH based on multi-TRP, by design enhancement of high-level signaling and DCI commands, power boosting control of OLPC can be performed for different TRPs separately, thus solving the problem of power control when the URLLC service and/or eMBB service conflict, and ensuring high reliability of the URLLC service.

Based on the same ideas, embodiments of the disclosure also provides an open-loop power control method for an uplink PUSCH, which is performed by a terminal.

Figure 6:
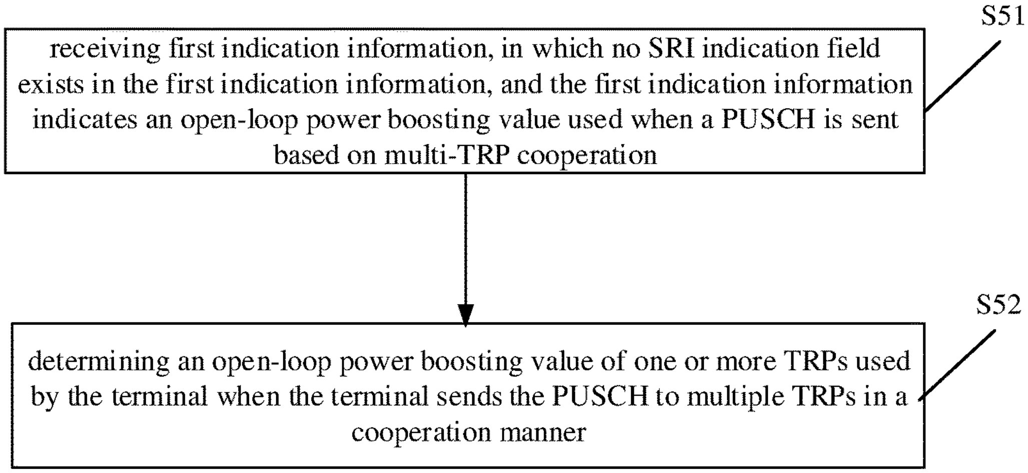
FIG. 6 is a flowchart of an open-loop power control method for an uplink PUSCH according to an exemplary embodiment.

FIG. 6 is a flowchart of an open-loop power control method for an uplink PUSCH according to an exemplary embodiment. The method may be performed alone or in combination with other embodiments of the disclosure. As illustrated in FIG. 6, the method includes the following steps.

At step S51, first indication information is received, no SRI indication field exists in the first indication information, and the first indication information is used to indicate an open-loop power boosting value used when a PUSCH is sent based on multi-TRP cooperation.

At step S52, an open-loop power boosting value of one or more TRPs used by the terminal when the terminal sends the PUSCH to multiple TRPs in a cooperation manner is determined.

The open-loop power boosting value used when the PUSCH is sent corresponds to different cooperative TRPs that send the PUSCH.

In an implementation, each TRP direction of the multiple cooperative TRPs indicated by the first indication information is configured with a power control parameter set, each power control parameter set includes one or more OLPC parameters of a corresponding TRP direction. When the terminal determines the open-loop power boosting value of one or more TRPs used by the terminal when the terminal sends the PUSCH to the multiple TRPs in the cooperation manner, the terminal may determines, in the power control parameter set corresponding to each TRP direction, an OLPC parameter corresponding to the TRP direction used by the terminal when the terminal sends the PUSCH to the multiple TRPs in the cooperation manner.

In an implementation, the first indication information is carried in DCI, and the DCI includes an information field: the information field indicates the open-loop power boosting value of the one or more TRPs used by the terminal when the terminal sends the PUSCH to the multiple TRPs in the cooperation manner.

In an implementation, the information field indicates that the one or more TRPs used when the terminal sends the PUSCH to the multiple TRPs in the cooperation manner correspond to a same OLPC parameter.

In an implementation, the DCI includes a first OLPC power code point associated with the PUSCH power control set corresponding to each TRP. The terminal determines, in the PUSCH power control set corresponding to each TRP associated with the first OLPC power code point, the open-loop power boosting value used on a corresponding TRP when the terminal sends the PUSCH to the multiple TRPs in the cooperation manner.

In an implementation, the DCI includes a first OLPC power code point and second indication information, the second indication information indicating whether the one or more TRPs used when the terminal sends the PUSCH to the multiple TRPs in the cooperation manner have a same interference situation, and/or information of a TRP that requires power boosting in one or more TRPs used when the PUSCH is sent to the multiple TRPs in the cooperation manner.

In an implementation, in response to the second indication information indicating that the one or more TRPs used when the terminal sends the PUSCH to the multiple TRPs in the cooperation manner have the same interference situation, the terminal determines, in the PUSCH power set corresponding to each TRP associated with the first OLPC power code point, an open-loop power boosting value used on a corresponding TRP when the terminal sends the PUSCH to the multiple TRPs in the cooperation manner according to the same OLPC parameter.

In another implementation, in response to the second indication information indicating that the one or more TRPs used when the terminal sends the PUSCH to the multiple TRPs in the cooperation manner have different interference situations, or the second indication information indicating that the TRP requiring the power boosting is a first cooperative TRP, an open-loop power boosting value used on the first cooperative TRP when the terminal sends the PUSCH to the multiple TRPs in the cooperation manner is determined in the PUSCH power control parameter set associated with the first OLPC power code point. An open-loop power boosting value used on a second cooperative TRP when the terminal sends the PUSCH to the multiple TRPs in the cooperation manner based on a predefined mode is determined in the PUSCH power set associated with the first OLPC power code point.

The second cooperative TRP includes one or more TRPs different from the first cooperative TRP in the one or more TRPs used when the terminal sends the PUSCH to the multiple TRPs in the cooperation manner.

In an implementation, the second indication information may be a maximum extended bit in the Open-loop power control parameter set indication field. Alternatively, the second indication information may be a minimum extended bit value in the Open-loop power control parameter set indication field.

In an implementation, the terminal may determine a cooperative TRP corresponding to the open-loop power boosting value after determining the OLPC power boosting value.

In an implementation, the terminal may determine the cooperative TRP corresponding to the open-loop power boosting value by at least one of the following method 1 and method 2.

Method 1: the cooperative TRP corresponding to the open-loop power boosting value is determined according to an SRS resource set identifier corresponding to a power control parameter set corresponding to each TRP direction, in which a magnitude of the SRS resource set identifier has a correspondence with a direction order of the TRPs. For example, a TRP corresponding a minimum SRS resource set identifier is fixed as the first TRP, the cooperative TRP applicable to the OLPC power boosting value is determined according to the SRS resource set identifier corresponding to the power control parameter set corresponding to the TRP direction.

Method 2: the cooperative TRP corresponding to the open-loop power boosting value is determined determining according to a mapping relationship between the cooperative TRPs and SRS resource sets indicated in the DCI indication field for dynamically indicating switching between a single-TRP mode and a multi-TRP mode. The direction order of the cooperative TRPs is consistent with the mapping relationship between the cooperative TRPs and the SRS resource sets indicated in the DCI indication field.

In embodiments of the disclosure, when the terminal sends a PUSCH to multiple TRPs in a cooperation manner, it is possible to control the open-loop power control parameters of the one or more TRPs used, so as to achieve power boosting control of OLPC, thus solving the problem of power control when the URLLC service and/or eMBB service conflict, and ensuring high reliability of the URLLC service.

It can be understood that the open-loop power control method for an uplink PUSCH performed by the terminal in the embodiments of the disclosure has similarities with the open-loop power control method for an uplink PUSCH performed by the network device. Therefore, for parts where the description of the open-loop power control method for an uplink PUSCH performed by the terminal in the embodiments of the disclosure is not detailed enough, reference may be made to the open-loop power control method for an uplink PUSCH performed by the network device in the above embodiments.

It can be further understood that the open-loop power control method for an uplink PUSCH provided in the embodiments of the disclosure can also be applied to the a scenario in which the terminal and the network device interact with each other to implement the implementing process of the open-loop power control for an uplink PUSCH. In the process of implementing the open-loop power control for an uplink PUSCH through interaction between network device and the terminal, the network device and the terminal respectively have the relevant functions involved in the above embodiments, which will not be elaborated here.

It should be noted that those skilled in the art can understand that the various embodiments/implementations involved in the embodiments of the disclosure can be used in combination with the foregoing embodiments or can be used independently. Whether they are used alone or together with the foregoing embodiments, the realization principles are similar. In embodiments of the disclosure, some embodiments are illustrated in a way that they are used together. Certainly, those skilled in the art can understand that such illustrative descriptions are not considered as a limitation of the embodiments of the disclosure.

Based on the same ideas, embodiments of the disclosure also provide an open-loop power control apparatus for an uplink PUSCH.

It can be understood that the open-loop power control apparatus for an uplink PUSCH provided by the embodiments of the disclosure includes hardware structures and/or software modules for performing respective functions in order to achieve the above functions. Based on the units and algorithmic steps of the various examples disclosed in the embodiments of the disclosure, the embodiments of the disclosure can be implemented in the form of hardware or a combination of hardware and computer software. Whether a particular function is performed by hardware or by a way of driving hardware by computer software depends on the particular application and design constraints of the technical solution. Those skilled in the art may use different methods for each particular application to implement the described functions, but such implementation should not be considered as beyond the scope of the technical solutions of the embodiments of the disclosure.

Figure 7:
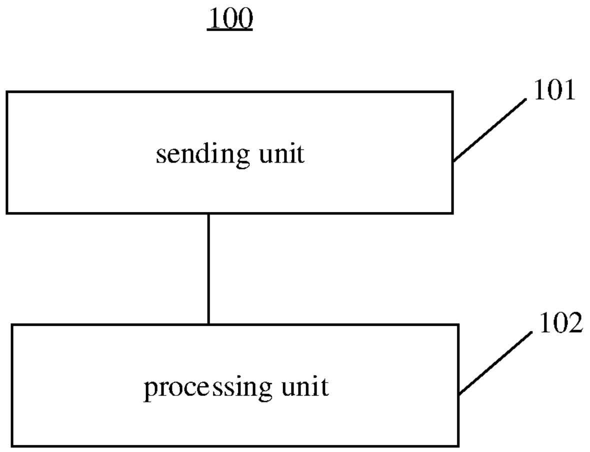
FIG. 7 is a block diagram of an open-loop power control apparatus for an uplink PUSCH according to an exemplary embodiment.

FIG. 7 is a block diagram of an open-loop power control apparatus for an uplink PUSCH according to an exemplary embodiment. As illustrated in FIG. 7, the open-loop power control apparatus 100 for an uplink PUSCH is applied to a network device, including: a sending unit 101 and a processing unit 102.

The sending unit 101 is configured to send first indication information.

The processing unit 102 is configured to, in response to an absence of an SRI indication field in the first indication information, configure and determine an OLPC parameter of one or more TRPs used by a terminal when the terminal sends a PUSCH to multiple TRPs in a cooperation manner, the OLPC parameter including a corresponding open-loop power boosting value. The first indication information indicates an open-loop power boosting value used when the PUSCH is sent based on multi-TRP cooperation, and the open-loop power boosting value used when the PUSCH is sent corresponds to different cooperative TRPs to which the PUSCH is sent.

In an implementation, the processing unit 102 is configured to configure a power control parameter set for each TRP direction of the multiple cooperative TRPs indicated by the first indication information, each power control parameter set including one or more OLPC parameters of a corresponding TRP direction. In the power control parameter set corresponding to each TRP direction, the processing unit 102 is configured to determine an OLPC parameter corresponding to the TRP direction used by the terminal when the terminal sends the PUSCH to the multiple TRPs in the cooperation manner.

In an implementation, the first indication information is carried in DCI, and the DCI includes an information field; the information field indicates the open-loop power boosting value of the one or more TRPs used by the terminal when the terminal sends the PUSCH to the multiple TRPs in the cooperation manner.

In an implementation, the information field indicates that the one or more TRPs used when the terminal sends the PUSCH to the multiple TRPs in the cooperation manner correspond to a same OLPC parameter.

In an implementation, the DCI includes a first OLPC power code point associated with the PUSCH power control set corresponding to each TRP. The processing unit 102 is configured to, in the PUSCH power control set corresponding to each TRP associated with the first OLPC power code point, determine an open-loop power boosting value used on a corresponding TRP when the terminal sends the PUSCH to the multiple TRPs in the cooperation manner.

In an implementation, the DCI includes a first OLPC power code point and second indication information, the second indication information indicating whether the one or more TRPs used by the terminal when the terminal sends the PUSCH to the multiple TRPs in the cooperation manner have a same interference situation, and/or information of a TRP that requires power boosting in one or more TRPs used when the PUSCH is sent to the multiple TRPs in the cooperation manner.

In an implementation, in response to the second indication information indicating that the one or more TRPs used when the terminal sends the PUSCH to the multiple TRPs in the cooperation manner have the same interference situation, the processing unit 102 is configured to determine, in the PUSCH power set corresponding to each TRP associated with the first OLPC power code point, an open-loop power boosting value used on a corresponding TRP when the terminal sends the PUSCH to the multiple TRPs in the cooperation manner according to the same OLPC parameter.

In response to the second indication information indicating that the one or more TRPs used when the terminal sends the PUSCH to the multiple TRPs in the cooperation manner have different interference situations, or the second indication information indicating that the TRP requiring the power boosting is a first cooperative TRP, the processing unit 102 is configured to determine, in the PUSCH power control parameter set associated with the first OLPC power code point, an open-loop power boosting value used on the first cooperative TRP when the terminal sends the PUSCH to the multiple TRPs in the cooperation manner, and determine, in the PUSCH power set associated with the first OLPC power code point, an open-loop power boosting value used on a second cooperative TRP when the terminal sends the PUSCH to the multiple TRPs in the cooperation manner based on a predefined mode; in which the second cooperative TRP includes one or more TRPs different from the first cooperative TRP in the one or more TRPs used when the terminal sends the PUSCH to the multiple TRPs in the cooperation manner.

In an implementation, the second indication information includes: a maximum extended bit in the information field: or a minimum extended bit value in the information field.

In an implementation, the processing unit 102 is configured to determine a cooperative TRP corresponding to the open-loop power boosting value.

In an implementation, the cooperative TRP corresponding to the open-loop power boosting value is determined by at least one of:

- determining according to an SRS resource set identifier corresponding to a power control parameter set corresponding to each TRP direction, in which a magnitude of the SRS resource set identifier has a correspondence with a direction order of the TRPs; and
- determining according to a mapping relationship between the cooperative TRPs and SRS resource sets indicated in the DCI indication field for dynamically indicating switching between a single-TRP mode and a multi-TRP mode, in which the direction order of the cooperative TRPs is consistent with the mapping relationship between the cooperative TRPs and the SRS resource sets indicated in the DCI indication field.

Figure 8:
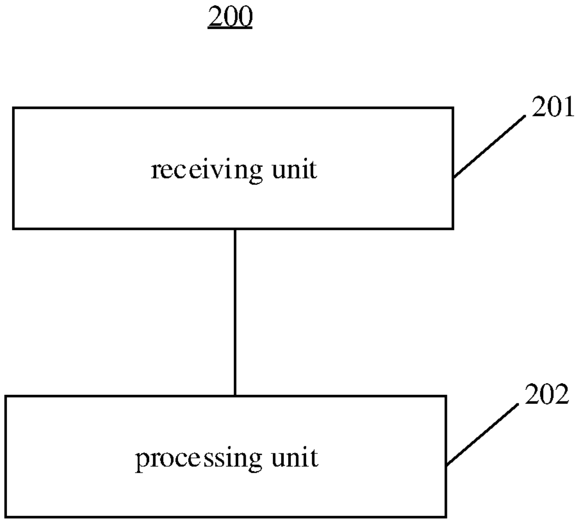
FIG. 8 is a block diagram of an open-loop power control apparatus for an uplink PUSCH according to an exemplary embodiment.

FIG. 8 is a block diagram of an open-loop power control apparatus for an uplink PUSCH according to an exemplary embodiment. As illustrated in FIG. 8, the open-loop power control apparatus 200 for an uplink PUSCH is applied to a terminal, including: a receiving unit 201 and a processing unit 202

The receiving unit 201 is configured to receive first indication information, in which no SRI indication field exists in the first indication information, and the first indication information indicates an open-loop power boosting value used when a PUSCH is sent based on multi-TRP cooperate.

The processing unit 202 is configured to determine an open-loop power boosting value of one or more TRPs used by a terminal when the terminal sends the PUSCH to multiple TRPs in a cooperation manner, in which the open-loop power boosting value used when the PUSCH is sent corresponds to different cooperative TRPs to which the PUSCH to which.

In an implementation, each TRP direction of the multiple cooperative TRPs indicated by the first indication information is configured with a power control parameter set, each power control parameter set includes one or more OLPC parameters of a corresponding TRP direction. The processing unit 202 is configured to determine the open-loop power boosting value of one or more TRPs used by the terminal when the terminal sends the PUSCH to the multiple TRPs in the cooperation manner, including: in the power control parameter set corresponding to each TRP direction, determining an OLPC parameter corresponding to the TRP direction used by the terminal when the terminal sends the PUSCH to the multiple TRPs in the cooperation manner.

In an implementation, the first indication information is carried in downlink control information (DCI), and the DCI includes an information field: the information field indicates the open-loop power boosting value of the one or more TRPs used by the terminal when the terminal sends the PUSCH to the multiple TRPs in the cooperation manner.

In an implementation, the information field indicates that the one or more TRPs used when the terminal sends the PUSCH to the multiple TRPs in the cooperation manner correspond to a same OLPC parameter.

In an implementation, the DCI includes a first OLPC power code point associated with the PUSCH power control set corresponding to each TRP. The processing unit 202 is configured to determine the open-loop power boosting value of the one or more TRPs used by the terminal when the terminal sends the PUSCH to the multiple TRPs in the cooperation manner, including: in the PUSCH power control set corresponding to each TRP associated with the first OLPC power code point, determining the open-loop power boosting value used on a corresponding TRP when the terminal sends the PUSCH to the multiple TRPs in the cooperation manner.

In an implementation, the DCI includes a first OLPC power code point and second indication information, the second indication information indicating whether the one or more TRPs used when the terminal sends the PUSCH to the multiple TRPs in the cooperation manner have a same interference situation, and/or information of a TRP that requires power boosting in one or more TRPs used when the PUSCH is sent to the multiple TRPs in the cooperation manner.

In an implementation, in response to the second indication information indicating that the one or more TRPs used when the terminal sends the PUSCH to the multiple TRPs in the cooperation manner have the same interference situation, the processing unit 202 is configured to determine, in the PUSCH power set corresponding to each TRP associated with the first OLPC power code point, an open-loop power boosting value used on a corresponding TRP when the terminal sends the PUSCH to the multiple TRPs in the cooperation manner according to the same OLPC parameter.

In response to the second indication information indicating that the one or more TRPs used when the terminal sends the PUSCH to the multiple TRPs in the cooperation manner have different interference situations, or the second indication information indicating that the TRP requiring the power boosting is a first cooperative TRP, the processing unit 202 is configured to: determine, in the PUSCH power control parameter set associated with the first OLPC power code point, an open-loop power boosting value used on the first cooperative TRP when the terminal sends the PUSCH to the multiple TRPs in the cooperation manner, and determine, in the PUSCH power set associated with the first OLPC power code point, an open-loop power boosting value used on a second cooperative TRP when the terminal sends the PUSCH to the multiple TRPs in the cooperation manner based on a predefined mode:

The second cooperative TRP includes one or more TRPs different from the first cooperative TRP in the one or more TRPs used when the terminal sends the PUSCH to the multiple TRPs in the cooperation manner.

In an implementation, the second indication information includes: a maximum extended bit in the information field: or a minimum extended bit value in the information field.

In an implementation, the processing unit 202 is configured to determine a cooperative TRP corresponding to the open-loop power boosting value.

In an implementation, the cooperative TRP corresponding to the open-loop power boosting value is determined by at least one of:

determining according to an SRS resource set identifier corresponding to a power control parameter set corresponding to each TRP direction, in which a magnitude of the SRS resource set identifier has a correspondence with a direction order of the TRPs; and determining according to a mapping relationship between the cooperative TRPs and SRS resource sets indicated in the DCI indication field for dynamically indicating switching between a single-TRP mode and a multi-TRP mode, in which the direction order of the cooperative TRPs is consistent with the mapping relationship between the cooperative TRPs and the SRS resource sets indicated in the DCI indication field.

Regarding the apparatuses in the above embodiments, the specific way in which each module performs its operation has been described in detail in the method embodiments, and will not be described in detail here.

Figure 9:
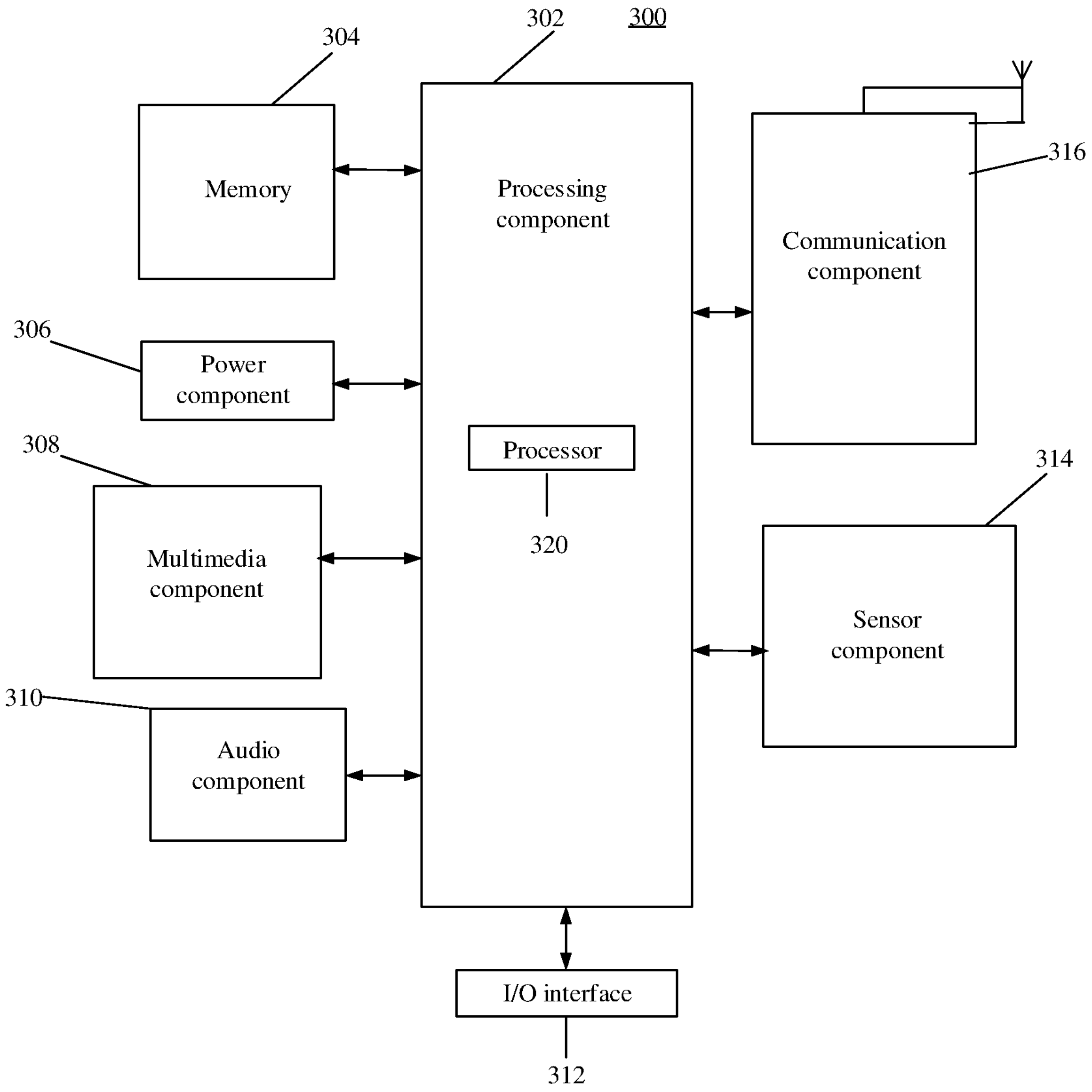
FIG. 9 is a block diagram of an open-loop power control device for an uplink PUSCH according to an exemplary embodiment.

FIG. 9 is a block diagram of an open-loop power control device for an uplink PUSCH according to an exemplary embodiment. For example, the device 300 may be a mobile phone, a computer, a digital broadcasting terminal, a message transceiver device, a game console, a tablet device, a medical device, a fitness device and a PDA.

As illustrated in FIG. 13, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone call, data communication, camera operation, and recording operation. The processing component 302 may include one or more processors 320 to perform instructions to implement all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a calling mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of a user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G, or 3G, or a combination thereof. In an exemplary embodiment, the communication component 316 receives a broadcast signal from an external broadcast management system or broadcast associated information via a broadcast channel. In an exemplary embodiment, the communication component 316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the exemplary embodiments, there is also provided a non-transitory computer readable storage medium including instructions, such as the memory 304, executable by the processor 320 in the device 300, for implementing the above methods. For example, the non-transitory computer-readable storage medium may be a ROM, a Random Access Memory (RAM), a CD-ROM, a magnetic tape, a floppy disc, and an optical data storage device.

Figure 10:
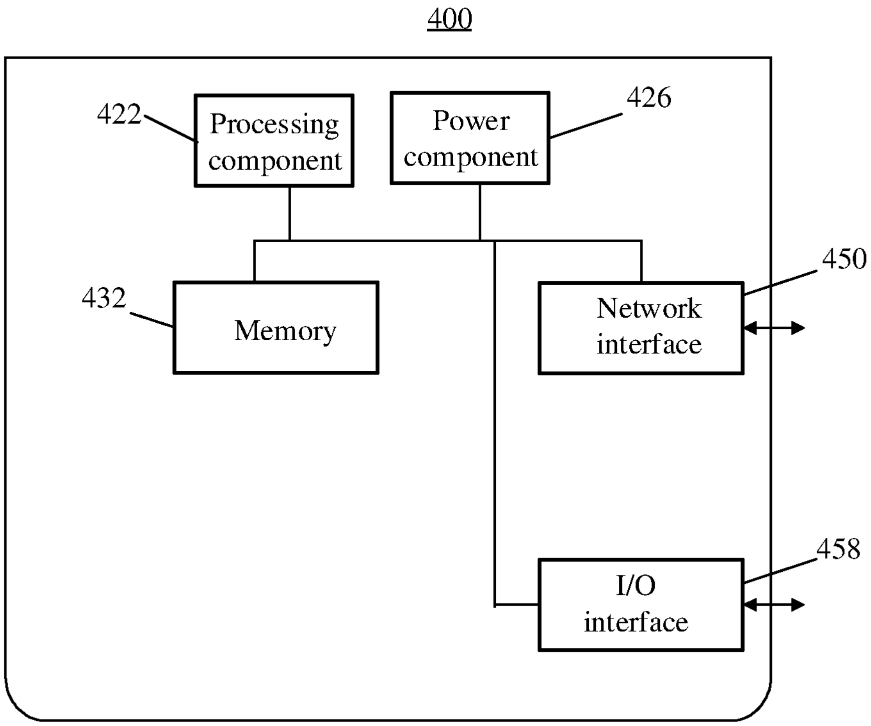
FIG. 10 is a block diagram of an open-loop power control device for an uplink PUSCH according to an exemplary embodiment.

FIG. 10 is a block diagram of an open-loop power control device for an uplink PUSCH according to an exemplary embodiment. For example, the device 400 may be provided as a network device. As illustrated in FIG. 14, the device 400 includes a processing component 422 including one or more processors, and memory resources represented by a memory 432 for storing instructions that can be executed by the processing component 422, such as applications. The application programs stored in the memory 432 may include one or more modules each corresponding to a set of instructions. In addition, the processing component 422 is configured to execute the instructions to perform the methods described above.

The device 400 may also include a power component 426 configured to perform power management of the device 400, a wired or wireless network interface 450 configured to connect the device 400 to a network, and an I/O interface 458. The device 400 may operate on an operating system stored in the memory 432, such as Windows Server™, Mac OS X™, Unix™, Linux™, FreeBSD™, or the like.

In the exemplary embodiments, there is also provided a non-transitory computer readable storage medium including instructions, such as the memory 432, executable by the processor 422 in the device 400, for implementing the above methods. For example, the non-transitory computer-readable storage medium may be a ROM, a RAM, a CD-ROM, a magnetic tape, a floppy disc, and an optical data storage device.

It is further understood that the term "multiple" in the disclosure refers to two or more, which is the similar for other quantifiers. The term "and/or" describes a relation of associated objects, which indicates three relations, for example, "A and/or B" indicates that A exists alone, A and B both exist, and B exists alone. The character "/" generally indicates that the associated objects prior to and after the character "/" is an "or" relation. The terms "a", "said" and "the" in the singular form are also intended to include the plural form, unless the context clearly indicates otherwise.

It is further understood that the terms "first", "second", etc. are used to describe various types of information, but that such information should not be limited to these terms. These terms are used only to distinguish information of the same type from each another and do not indicate a particular order or degree of importance. In fact, the expressions "first" and "second" can be used interchangeably. For example, without departing from the scope of this disclosure, first information may also be referred to as second information, and similarly, second information may also be referred to as first information.

It is further understood that although the operations are depicted in the accompanying drawings in a particular order in the embodiments of the disclosure, this should not be construed as requiring that the operations be performed in the particular sequence shown or in a serial sequence, or that all of the operations shown be performed to obtain the desired results. Multitasking and parallel processing may be advantageous in particular environments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An open-loop power control (OLPC) method for an uplink physical uplink shared channel (PUSCH), performed by a network device, comprising:

sending first indication information, wherein the first indication information indicates an open-loop power boosting value used when the PUSCH is sent based on multi-transmission reception point (multi-TRP) cooperation, and the open-loop power boosting value used when the PUSCH is sent corresponds to different cooperative TRPs to which the PUSCH is sent; and in response to an absence of a sounding reference signal (SRS) resource indication (SRI) indication field in the first indication information, configuring and determining an OLPC parameter of one or more transmission reception points (TRPs) used by a terminal when the terminal sends the PUSCH to multiple TRPs in a cooperation manner, the OLPC parameter comprising a corresponding open-loop power boosting value.

2. The method of claim 1, wherein configuring and determining the OLPC parameter of one or more TRPs used by the terminal when the terminal sends the PUSCH to the multiple TRPs in the cooperation manner comprises:

configuring a power control parameter set for each TRP direction of the multiple cooperative TRPs indicated by the first indication information, each power control parameter set comprising one or more OLPC parameters of a corresponding TRP direction; and in the power control parameter set corresponding to each TRP direction, determining an OLPC parameter corresponding to the TRP direction used by the terminal when the terminal sends the PUSCH to the multiple TRPs in the cooperation manner.

3. The method of claim 1, wherein the first indication information is carried in downlink control information (DCI), and the DCI comprises an information field;

the information field indicates the open-loop power boosting value of one or more TRPs used by the terminal when the terminal sends the PUSCH to the multiple TRPs in the cooperation manner.

4. The method of claim 3, wherein the information field indicates that the one or more TRPs used when the terminal sends the PUSCH to the multiple TRPs in the cooperation manner correspond to a same OLPC parameter.

5. The method of claim 4, wherein the DCI comprises a first OLPC power code point associated with a PUSCH power control parameter set corresponding to each TRP;

determining the OLPC parameter of the one or more TRPs used when the terminal sends the PUSCH to the multiple TRPs in the cooperation manner comprises:

in the PUSCH power control parameter set corresponding to each TRP associated with the first OLPC power code point, determining an open-loop power boosting value used on a corresponding TRP when the terminal sends the PUSCH to the multiple TRPs in the cooperation manner.

6. The method of claim 3, wherein the DCI comprises a first OLPC power code point and second indication information, the second indication information indicating at least one of: whether the one or more TRPs used when the terminal sends the PUSCH to the multiple TRPs in the cooperation manner have a same interference situation, or information of a TRP that requires power boosting in one or more TRPs used when the PUSCH is sent to the multiple TRPs in the cooperation manner.

7. The method of claim 6, wherein determining the OLPC parameter of the one or more TRPs used by the terminal when the terminal sends the PUSCH to the multiple TRPs in the cooperation manner comprises:

in response to the second indication information indicating that the one or more TRPs used when the terminal sends the PUSCH to the multiple TRPs in the cooperation manner have the same interference situation, determining, in a PUSCH power control parameter set corresponding to each TRP associated with the first OLPC power code point, an open-loop power boosting value used on a corresponding TRP when the terminal sends the PUSCH to the multiple TRPs in the cooperation manner according to the same OLPC parameter;

in response to the second indication information indicating that the one or more TRPs used when the terminal sends the PUSCH to the multiple TRPs in the cooperation manner have different interference situations, or the second indication information indicating that the TRP requiring the power boosting is a first cooperative TRP, determining, in the PUSCH power control parameter set associated with the first OLPC power code point, an open-loop power boosting value used on the first cooperative TRP when the terminal sends the PUSCH to the multiple TRPs in the cooperation manner, and determining, in the PUSCH power control parameter set associated with the first OLPC power code point, an open-loop power boosting value used on a second cooperative TRP when the terminal sends the PUSCH to the multiple TRPs in the cooperation manner based on a predefined mode;

wherein the second cooperative TRP comprises one or more TRPs different from the first cooperative TRP in the one or more TRPs used when the terminal sends the PUSCH to the multiple TRPs in the cooperation manner.

8. The method of claim 6, wherein the second indication information comprises:

a maximum extended bit in the information field; or a minimum extended bit value in the information field.

9. The method of claim 3, further comprising:

determining a cooperative TRP corresponding to the open-loop power boosting value.

10. The method of claim 9, wherein determining the cooperative TRP corresponding to the open-loop power boosting value comprises at least one of:

determining according to an SRS resource set identifier corresponding to a power control parameter set corresponding to each TRP direction, wherein a magnitude of the SRS resource set identifier has a correspondence with a direction order of the TRPs; or determining according to a mapping relationship between the cooperative TRPs and SRS resource sets indicated in the DCI indication field for dynamically indicating switching between a single-TRP mode and a multi-TRP mode, wherein the direction order of the cooperative TRPs is consistent with the mapping relationship between the cooperative TRPs and the SRS resource sets indicated in the DCI indication field.

11. An open-loop power control (OLPC) method for an uplink physical uplink shared channel (PUSCH), performed by a terminal, comprising:

receiving first indication information, wherein no sounding reference signal (SRS) resource indication (SRI) indication field exists in the first indication information, and the first indication information indicates an open-loop power boosting value used when a PUSCH is sent based on multi-TRP cooperation; and determining an open-loop power boosting value of one or more transmission reception points (TRPs) used by the terminal when the terminal sends the PUSCH to multiple TRPs in a cooperation manner, wherein the open-loop power boosting value used when the PUSCH is sent corresponds to different cooperative TRPs to which the PUSCH is sent.

12. The method of claim 11, wherein each TRP direction of the multiple cooperative TRPs indicated by the first indication information is configured with a power control parameter set, each power control parameter set comprises one or more OLPC parameters of a corresponding TRP direction;

determining the open-loop power boosting value of one or more TRPs used by the terminal when the terminal sends the PUSCH to the multiple TRPs in the cooperation manner comprises:

in the power control parameter set corresponding to each TRP direction, determining an OLPC parameter corresponding to the TRP direction used by the terminal when the terminal sends the PUSCH to the multiple TRPs in the cooperation manner.

13. The method of claim 11, wherein the first indication information is carried in downlink control information (DCI), and the DCI comprises an information field;

the information field indicates the open-loop power boosting value of one or more TRPs used by the terminal when the terminal sends the PUSCH to the multiple TRPs in the cooperation manner.

14. The method of claim 13, wherein the information field indicates that the one or more TRPs used when the terminal sends the PUSCH to the multiple TRPs in the cooperation manner correspond to a same OLPC parameter.

15. The method of claim 14, wherein the DCI comprises a first OLPC power code point associated with a PUSCH power control parameter set corresponding to each TRP;

determining the open-loop power boosting value of the one or more TRPs used when the terminal sends the PUSCH to the multiple TRPs in the cooperation manner comprises:

in the PUSCH power control parameter set corresponding to each TRP associated with the first OLPC power code point, determining the open-loop power boosting value used on a corresponding TRP when the terminal sends the PUSCH to the multiple TRPs in the cooperation manner.

16. The method of claim 13, wherein the DCI comprises a first OLPC power code point and second indication information, the second indication information indicating at least one of: whether the one or more TRPs used when the terminal sends the PUSCH to the multiple TRPs in the cooperation manner have a same interference situation, or information of a TRP that requires power boosting in one or more TRPs used when the PUSCH is sent to the multiple TRPs in the cooperation manner.

17. The method of claim 16, wherein determining the open-loop power boosting value of the one or more TRPs used by the terminal when the terminal sends the PUSCH to the multiple TRPs in the cooperation manner comprises:

in response to the second indication information indicating that the one or more TRPs used when the terminal sends the PUSCH to the multiple TRPs in the cooperation manner have the same interference situation, determining, in a PUSCH power control parameter set corresponding to each TRP associated with the first OLPC power code point, an open-loop power boosting value used on a corresponding TRP when the terminal sends the PUSCH to the multiple TRPs in the cooperation manner according to the same OLPC parameter;

in response to the second indication information indicating that the one or more TRPs used when the terminal sends the PUSCH to the multiple TRPs in the cooperation manner have different interference situations, or the second indication information indicating that the TRP requiring the power boosting is a first cooperative TRP, determining, in the PUSCH power control parameter set associated with the first OLPC power code point, an open-loop power boosting value used on the first cooperative TRP when the terminal sends the PUSCH to the multiple TRPs in the cooperation manner, and determining, in the PUSCH power control parameter set associated with the first OLPC power code point, an open-loop power boosting value used on a second cooperative TRP when the terminal sends the PUSCH to the multiple TRPs in the cooperation manner based on a predefined mode;

wherein the second cooperative TRP comprises one or more TRPs different from the first cooperative TRP in the one or more TRPs used when the terminal sends the PUSCH to the multiple TRPs in the cooperation manner.

18. The method of claim 16, wherein the second indication information comprises:

a maximum extended bit in the information field; or a minimum extended bit value in the information field.

19. The method of claim 13, further comprising:

determining a cooperative TRP corresponding to the open-loop power boosting value.

20. The method of claim 19, wherein the cooperative TRP corresponding to the open-loop power boosting value is determined by at least one of:

determining according to an SRS resource set identifier corresponding to a power control parameter set corresponding to each TRP direction, wherein a magnitude of the SRS resource set identifier has a correspondence with a direction order of the TRPs;

determining according to a mapping relationship between the cooperative TRPs and SRS resource sets indicated in the DCI indication field for dynamically indicating switching between a single-TRP mode and a multi-TRP mode, wherein the direction order of the cooperative TRPs is consistent with the mapping relationship between the cooperative TRPs and the SRS resource sets indicated in the DCI indication field.

* * * * *